US006622499B1

(12) United States Patent
Gielda et al.

(10) Patent No.: US 6,622,499 B1
(45) Date of Patent: Sep. 23, 2003

(54) MULTI-PURPOSE AIR CYCLE SYSTEM

(75) Inventors: Thomas P. Gielda, Brighton, MI (US); Guy D. Morris, Essex (GB); James R. Winkleman, Bloomfield, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/102,359

(22) Filed: Mar. 20, 2002

(51) Int. Cl.$^7$ .............................. F28B 9/00; F02B 33/00
(52) U.S. Cl. ........................... 62/172; 62/402; 123/563; 181/224; 415/208.1; 415/126
(58) Field of Search ............... 123/563; 62/172, 62/401, 402; 181/224, 225; 415/119, 208.2, 208.1, 221, 126

(56) References Cited

U.S. PATENT DOCUMENTS

| | | | | |
|---|---|---|---|---|
| 2,287,822 A | * | 6/1942 | Odor et al. ............... | 415/208.1 |
| 2,526,103 A | | 10/1950 | Wood ........................... | 62/402 |
| 2,703,560 A | | 3/1955 | Lieberherr .................. | 123/563 |
| 2,703,561 A | | 3/1955 | Froehlich .................... | 123/563 |
| 2,734,443 A | | 2/1956 | Wood ........................... | 62/172 |
| 2,752,891 A | * | 7/1956 | Farkas ......................... | 62/172 |
| 2,917,288 A | * | 12/1959 | Sims, Jr. et al. ............ | 165/235 |
| 3,877,246 A | * | 4/1975 | Schutze ....................... | 62/402 |
| 4,014,179 A | | 3/1977 | Iles et al. .................... | 62/172 |
| 4,018,060 A | | 4/1977 | Kinsell et al. .............. | 123/563 |
| 4,374,469 A | * | 2/1983 | Rannenberg ................ | 62/172 |
| 4,503,683 A | * | 3/1985 | Wieland et al. ............ | 62/402 |
| 5,086,622 A | * | 2/1992 | Warner ........................ | 62/172 |
| 5,086,625 A | | 2/1992 | Momose et al. ............ | 62/172 |
| 5,172,753 A | | 12/1992 | Kadle et al. ................ | 62/402 |
| 5,426,268 A | * | 6/1995 | Yazici et al. ............... | 181/224 |
| 5,462,110 A | * | 10/1995 | Sarver ........................ | 62/402 |
| 5,473,123 A | * | 12/1995 | Yazici et al. ............... | 181/224 |
| 5,623,893 A | * | 4/1997 | Bartz et al. ................. | 415/126 |
| 5,749,702 A | * | 5/1998 | Datta et al. ................ | 415/119 |
| 6,230,494 B1 | | 5/2001 | Botti et al. | |
| 6,360,557 B1 | * | 3/2002 | Reznik ........................ | 62/402 |
| 6,381,973 B1 | | 5/2002 | Bhatti et al. ................ | 62/172 |

* cited by examiner

Primary Examiner—Thomas Denion
Assistant Examiner—Thai-Ba Trieu
(74) Attorney, Agent, or Firm—Brinks Hofer Gilson & Lione

(57) ABSTRACT

An air cycle system for use in a vehicle having an internal combustion engine is provided. A compressor has an outflow to an intercooler with an outflow to a first bypass valve. The first bypass valve has an open and a closed orientation, directing air to the engine of the vehicle in the open orientation and directing air to an expander in the closed orientation. The expander has an outflow to a second bypass valve that is adjustable so it can direct a variable fraction of air to the engine and the remainder of the air to an air handling unit. The air handling unit has at least a fan, a scroll center, and first and second air flow paths. The first air flow path has an input at the scroll center from the second bypass valve and the second air flow path has an input at the fan from the interior of the vehicle. The air handling unit mixes air from the first and second flow paths and directs the mixed air to the interior of the vehicle.

21 Claims, 6 Drawing Sheets

MULTI-PURPOSE AIR CYCLE SYSTEM

FIELD OF THE INVENTION

The invention relates generally to the field of air routing systems. In particular, this invention relates to a multi-purpose air cycle system for use in a vehicle having an internal combustion engine.

DESCRIPTION OF THE RELATED ART

Present day automobile air conditioning systems commonly use refrigerants such as freon or R134a. A standard refrigerant loop includes a compressor, an evaporator, a condenser, a receiver, a drier, an expansion valve and numerous refrigerant hoses. These standard configurations have disadvantages, however. For example, the refrigerant level must be monitored and refilled during the life of the vehicle. Furthermore, emissions from materials such as freon can also cause environmental problems.

Standard refrigerant loops require a large amount of package space in the vehicle, requiring other components of the vehicle to be reduced in size in order to accommodate the air conditioning system. Additionally, standard automobile air conditioning systems are only utilized to regulate the climate of the vehicle, while other systems are necessary to cool and/or supercharge the engine. This also requires increased package size and increases the weight of the vehicle.

Many prior art systems utilizing an open Brayton refrigeration cycle have an isentropic efficiency that is below acceptable levels for automobile air conditioning systems. In addition, prior art systems integrating supercharging with climate control have had difficulty adequately regulating the temperature of the air supplied to the interior of the vehicle. It is desirable to integrate the air conditioning system with the engine supercharging and cooling systems to reduce package size and weight, while also maintaining adequate and efficient control over the temperature and humidity of the conditioned air supplied to the interior of the vehicle.

BRIEF SUMMARY OF THE INVENTION

In one embodiment of the present invention, an air cycle system for use in a vehicle having an internal combustion engine is provided. A compressor has an outflow to an intercooler with an outflow to a first bypass valve. The first bypass valve has an open and a closed orientation, directing air to the engine of the vehicle in the open orientation and directing air to an expander in the closed orientation. The expander has an outflow to a second bypass valve that is adjustable so it can direct a variable fraction of air to the engine and the remainder of the air to an air handling unit. The air handling unit has at least a fan, a scroll center, and first and second air flow paths. The first air flow path has an input at the scroll center from the second bypass valve and the second air flow path has an input at the fan from the interior of the vehicle. The air handling unit mixes air from the first and second flow paths and directs the mixed air to the interior of the vehicle.

In a second embodiment of the present invention, an air cycle system for use in a vehicle having an internal combustion engine is provided. A compressor has an output to an intercooler having an outlet to a first bypass valve. The first bypass valve has an open orientation wherein cooled and pressurized air is supplied to the engine and a closed orientation wherein air is directed to an expander. The expander has an output to a second bypass valve capable of supplying a variable amount of cooled and dried air to the engine and the remaining air to an air mixing device at a first input. The air mixing device has a second input from the interior of the vehicle and is capable of mixing air from the second bypass valve and the second input and directing the mixed air to the interior of the vehicle.

In a third embodiment of the present invention, a method for supplying conditioned air to the interior of a vehicle, pressurized air to an engine for aid during acceleration, and cooling air to an engine to improve horsepower and fuel economy is provided. The method comprises the steps of first increasing air pressure in a compressor and cooling the air in an intercooler. This air is routed from the intercooler to the engine during high demand conditions and routed to an expander during low demand conditions. The air routed to the expander is cooled in the expander and a variable fraction of this cooled air is routed to the engine to cool the engine. The remainder of this air is routed to an air mixing device where the air is mixed with air from the interior of the vehicle. This mixed air is delivered to the interior of the vehicle for climate control.

DETAILED DESCRIPTION OF THE PREFERRED EMBODIMENTS OF THE INVENTION

The preferred embodiment of the present invention provides an air cycle system capable of supplying conditioned air to the interior 11 of a vehicle as well as functioning as both a supercharger and a charge air cooling system for the engine. This allows a reduction in package size and weight, as numerous components of the vehicle are integrated. The present invention uses the open Brayton refrigeration cycle. By using a Brayton cycle, the need for environmental contaminants such as freon, or refrigerant fluids such as R134a are unnecessary. The complex arrangement of refrigerant tubes utilized in many of today's air conditioning systems are also eliminated. Eliminating the refrigerant tubes reduces the cost of maintaining the system, and the need to refill the fluid in the system is also eliminated.

A Brayton cycle is a cooling cycle that can utilize air alone as the working fluid. In an ideal Brayton cycle, a fluid is compressed at constant entropy cooled at constant pressure in an intercooler and then isentropically expanded to atmospheric pressure. The present invention utilizes this cooled air in numerous ways.

Figure 1:
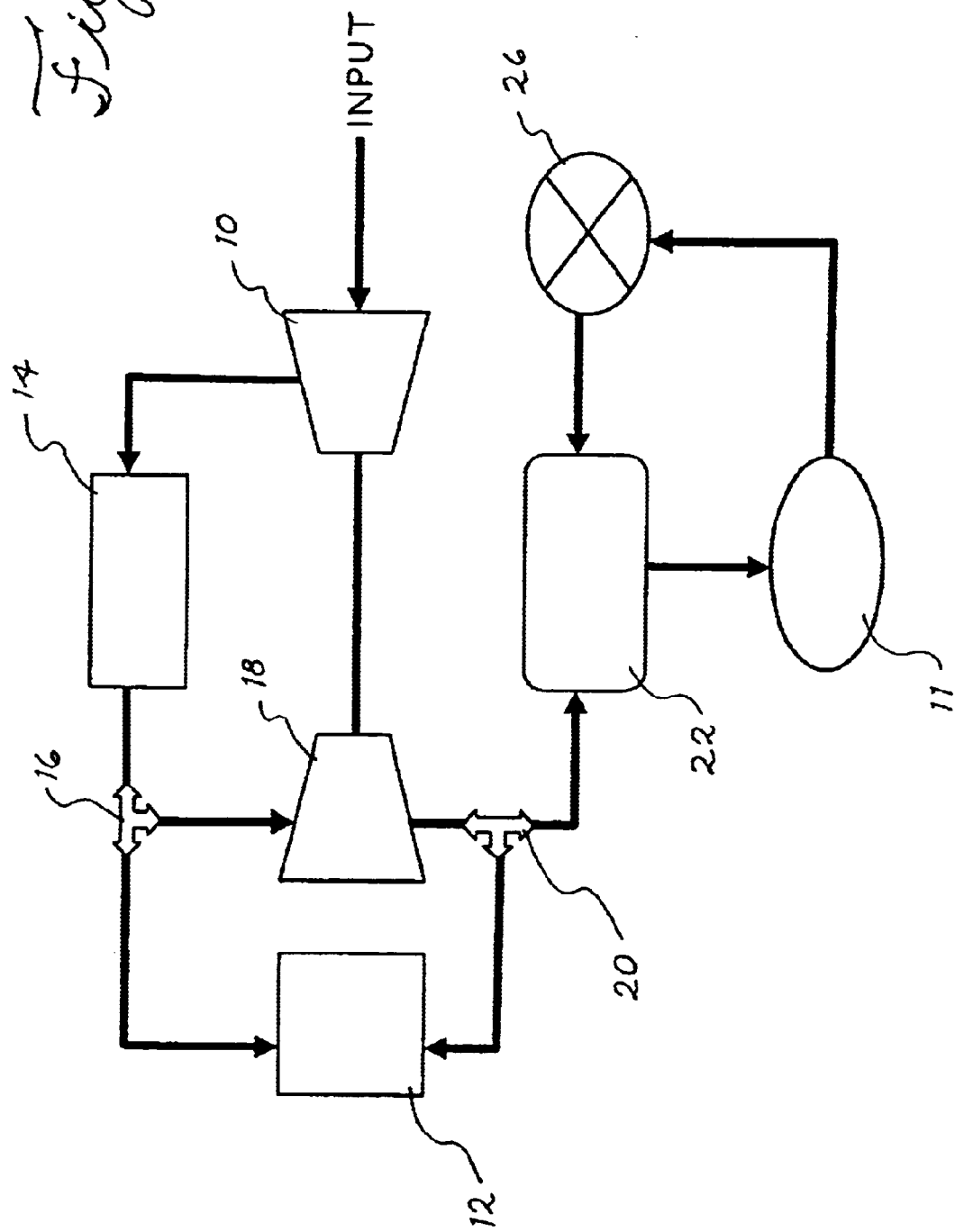
FIG. 1 is a schematic view of an embodiment of the present invention.
Figure 2:
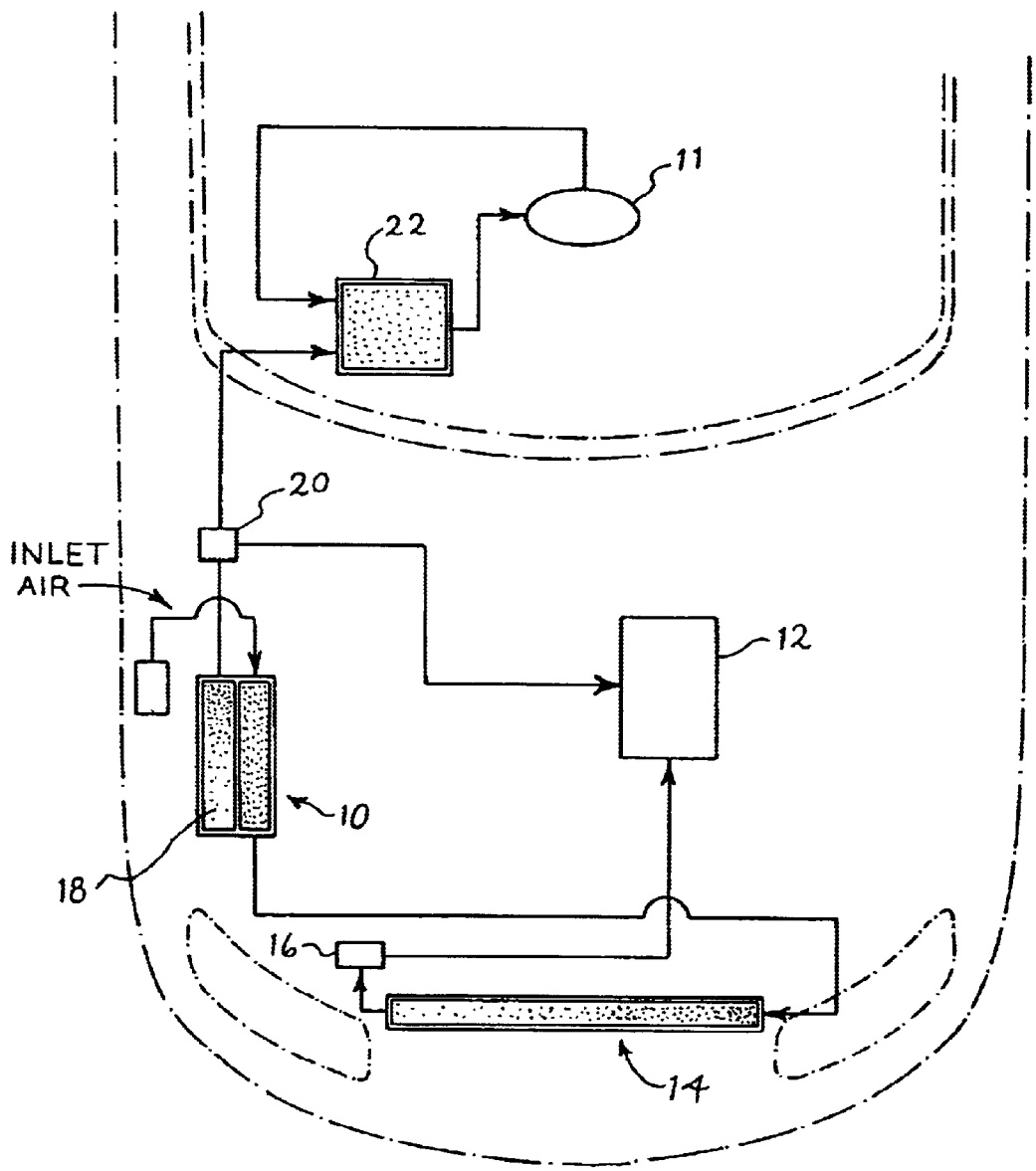
FIG. 2 is a view of the embodiment of FIG. 1 positioned in a vehicle.

Referring to FIGS. 1 and 2, a preferred embodiment is shown. FIG. 1 shows this preferred embodiment in schematic form, and FIG. 2 shows this preferred embodiment in schematic form installed in a vehicle. The air cycle system of the present invention preferably includes a compressor 10. The compressor 10 is preferably a standard high-efficiency screw compressor 10 and has an input that draws air into the compressor 10. The input is preferably air from the outside of the vehicle, although recirculated air from the interior 11 of the vehicle may also be used. A combination of inputs could also supply air to the compressor 10. The compressor 10 preferably raises the pressure of the air by a factor of 2:1. In order to overcome the shortcomings of some compressors in the prior art, the preferred compressor 10 of the present invention has an isentropic efficiency of at least 85%. The compressor 10 is preferably driven by the engine 12 of the vehicle, but can also be driven electrically or otherwise.

The compressor 10 preferably has an outflow to an intercooler 14. The intercooler of the present invention is preferably a down-flow or cross-flow intercooler 14, with a series of axial passages (not shown) to route air through the intercooler 14 in order to cool it, as known in the prior art. The intercooler 14 preferably has a cycling condensate purge valve that acts to eliminate any condensation of water vapor that may occur in the intercooler 14. Condensation becomes a greater concern in certain conditions, such as moderate temperatures and high humidity. The high-pressure air entering the intercooler 14 exits the intercooler 14 at a much lower temperature.

Air exiting the intercooler 14 of the present invention is preferably routed to a first bypass valve 16. The first bypass valve 16 of the present invention preferably has two orientations. In the open orientation, the first bypass valve 16 routes the air to the engine 12 of the vehicle. This high-pressure, cooled air preferably acts to supercharge the engine 12 for added fuel efficiency and power. Preferably, a controller (not shown) controls the first bypass valve 16 and opens the first bypass valve 16 during high engine demand conditions, such as rapid acceleration. The controller could also be adjusted to open the first bypass valve 16 under other conditions, or at the command of the operator. When the first bypass valve 16 is in its open position, there will be much less air directed into the interior 11 of the vehicle until the engine power demand is relieved.

The first bypass valve 16 also preferably has a closed orientation. When the first bypass valve 16 is in its closed orientation, air is directed to an expander 18. Air is preferably routed in this manner under low demand conditions, such as when the vehicle is at cruising speed. Under normal operation, when the first bypass valve 16 is routing air to the expander 18, the air passes through the expander 18 to remove work from the system. The air exiting the expander 18 preferably has a much lower temperature than ambient temperature and is slightly above atmospheric pressure.

The expander 18 of the present invention preferably has an outflow to a second bypass valve 20 that is preferably controlled by a controller (not shown). This controller preferably utilizes an algorithm to adjust the amount of air supplied to either the engine 12 or the air handling unit 22 based on engine 12 needs. The air handling unit 22 may also be referred to as an air mixing device 22. The second bypass valve 20 is preferably capable of directing a variable fraction of air to the engine 12 of the vehicle, while simultaneously supplying the remainder of the air to the air handling unit 22. The fraction of air directed to the engine 12 is preferably cooled, dried, and low pressure air, and acts to increase horsepower and fuel economy.

Figure 3:
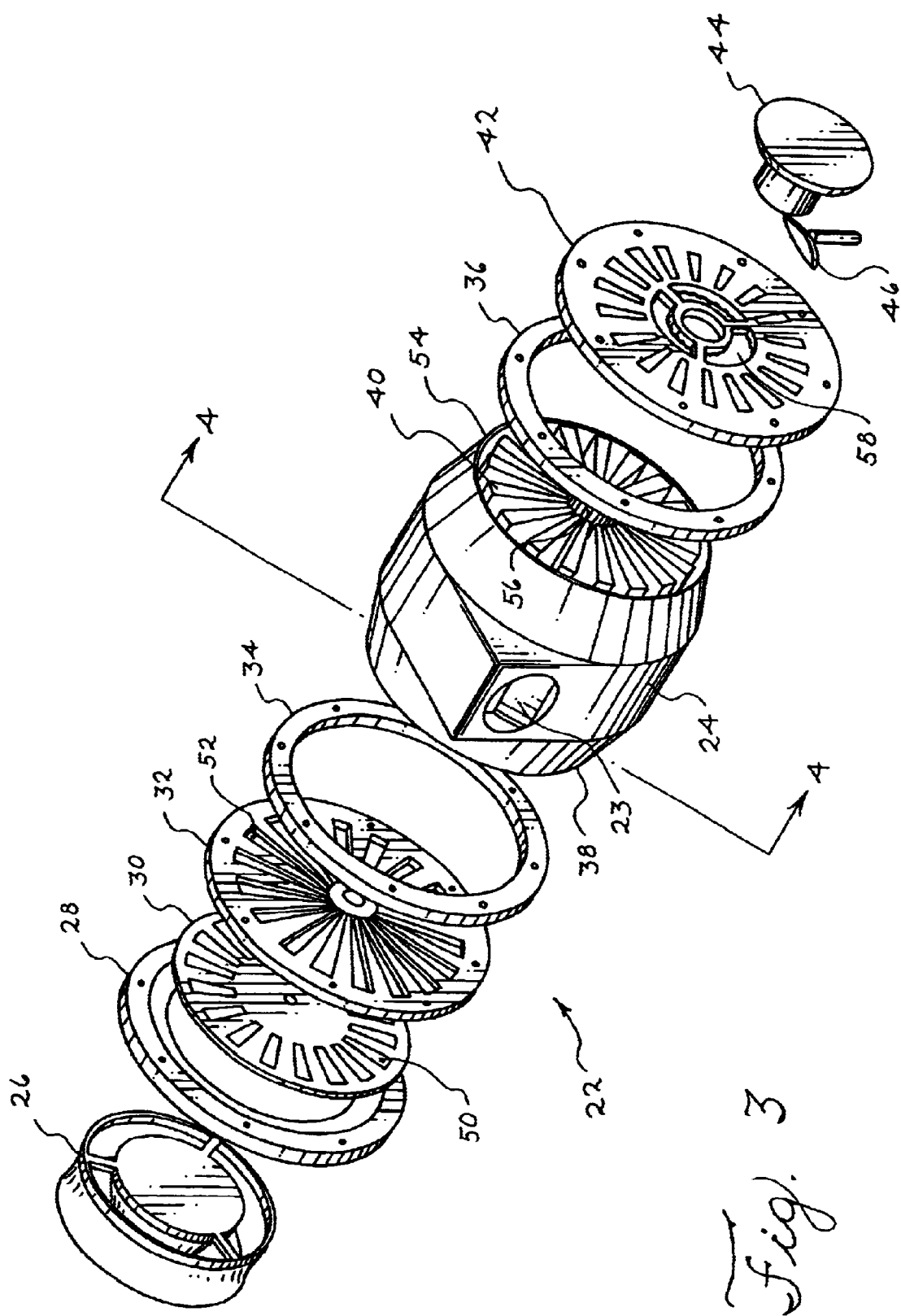
FIG. 3 is an exploded view of an embodiment of the air handling unit of the present invention.
Figure 4:
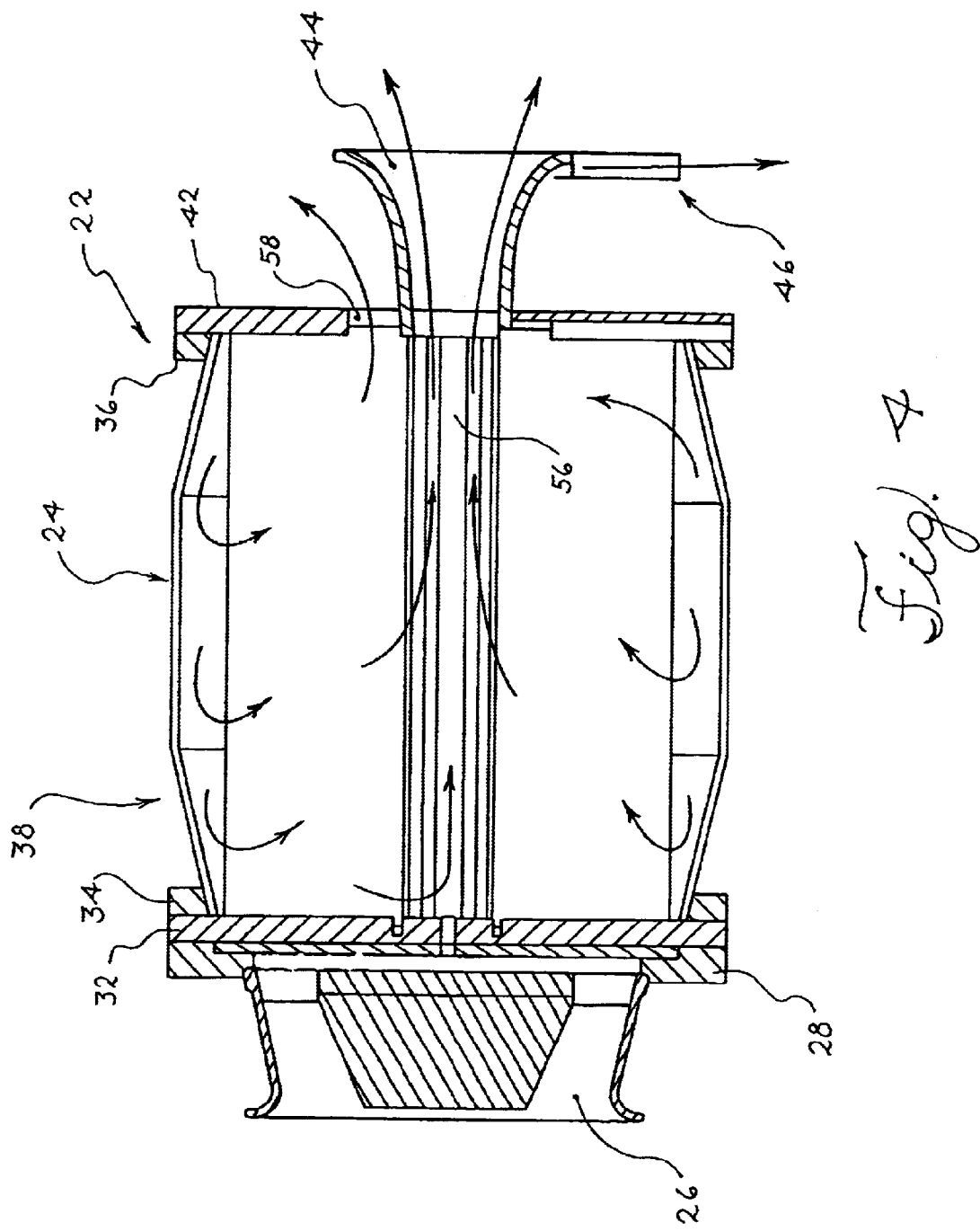
FIG. 4 is a cross-sectional view along line 4—4 of the air handling unit of FIG. 3, showing the first flow path.
Figure 5:
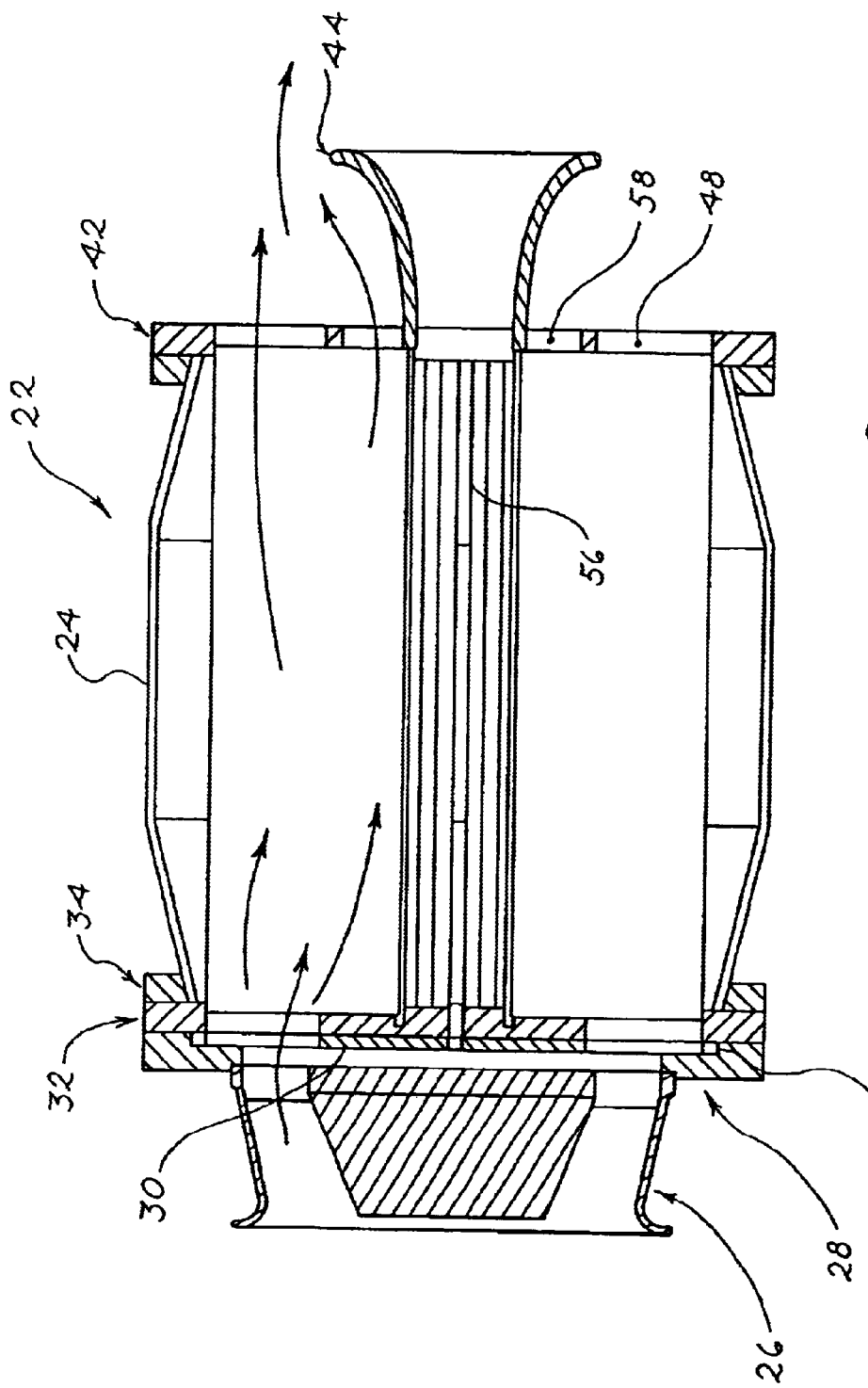
FIG. 5 is a cross-sectional view of the air handling unit of FIG. 3, showing the second flow path.

Referring in combination to FIGS. 3–5, an embodiment of the air handling unit 22 of the present invention is illustrated. The fraction of air directed to the air handling unit 22 from the second bypass valve 20 preferably enters the air handling unit 22 at the scroll center 24 of the air handling unit 22. The air entering the air handling unit 22 at the scroll center 24 travels through the air handling unit 22 along a first flow path, as shown by arrows in FIG. 4. The air handling unit 22 also preferably includes a second air flow path with an input at the fan 26 of the air handling unit 22. The fan 26 preferably draws air into the air handling unit 22 from the interior 11 of the vehicle and this air travels through the air handling unit 22 along a second flow path, as shown by arrows in FIG. 5. The air handling unit 22 also preferably comprises a fan flange 28, a valve plate 30, an upstream core flange 32, a first 34 and a second 36 scroll flange, a scroll cone 38, a core 40 containing triangular tubes 54, a downstream core flange 42 a condensate horn 46 and a condensate trap 48. In the preferred embodiment of the air handling device 22, the upstream 32 and downstream 42 cores are attached to first and second scroll flanges 34, 36. The upstream and downstream cores 32, 42 preferably do not rotate. The valve plate 30 preferably controls the amount of air supplied from the fan 26 to the second flow path. The valve plate 30 is capable of axial rotation, and preferably rotates no more than about 10° clockwise or counterclockwise. This allows the openings 50 in the valve plate 30 to move into and out of alignment with the openings 52 in the upstream core flange 32. When the openings 50 in the valve plate 30 are aligned with the openings 52 in the upstream core flange 32, air pulled into the air handling device 22 enters the core 40. The core 40 preferably contains a series of triangular tubes 54 positioned such that the first and second flow paths alternate between the triangular tubes 54. In other words, every other triangular tube 54 forms the first flow path, and the other triangular tubes 54 make up the second flow path. This configuration allows the triangular tubes 54 to keep the flow paths separate within the core 40. The triangular tubes 54 are preferably formed from a thin metal, such as aluminum.

In the preferred embodiment of the air handling unit 22 of the present invention, the first flow path, as illustrated in FIG. 4, routes air from an entry point 23 defined in the scroll center 24 to an exit at the condensate horn 44. Air entering the air handling unit 22 at the scroll center 24 from the second bypass valve 20 passes through the triangular tubes 54 into an axial passage 56 through the interior of the core 40. Preferably, a small portion of the air in the first flow path is also routed out of the air handling unit 22 through an opening 58 near the center axis of the downstream core flange 42.

The second flow path in the air handling unit 22 of the present invention is illustrated in FIG. 5. The fan 26 is preferably a low-power fan 26 that rotates to draw air into the air handling unit 22 from the interior 11 of the vehicle. When more warm air is needed to mix with the cool air in the first flow path from the second bypass valve 20, the valve plate 30 preferably rotates such that the openings 50 in the valve plate 30 align with the openings 52 in the upstream core flange 32. Air flows through the triangular tubes 54 in the core 40 and out of the air handling unit 22 through the openings 48, 58 in the downstream core flange 42. At this point the first and second flow paths preferably mix together and feed into the interior 11 of the vehicle.

The air handling unit 22 preferably mixes air from the first and second flow paths and directs the mixed air to the interior 11 of the vehicle. The temperature of the air entering the interior 11 of the vehicle is adjusted by modulating the cold air stream from the second bypass valve 20 and the recirculated air from the interior 11 of the vehicle drawn into the air handling unit 22 by the fan 26. The warm air stream from the interior 11 of the vehicle is modulated by the valve plate 30. The air handling unit 22 also preferably reduces the humidity level of the mixed air by trapping condensation in the condensate horn 44 and routing the condensation to the condensate trap 46. In this manner, the air cycle system of the present invention supplies temperature-controlled air to the interior 11 of the vehicle. The air handling unit 22 can be self-controlled, or can be controlled by a controller, as are the bypass valves 16, 20.

Figure 6:
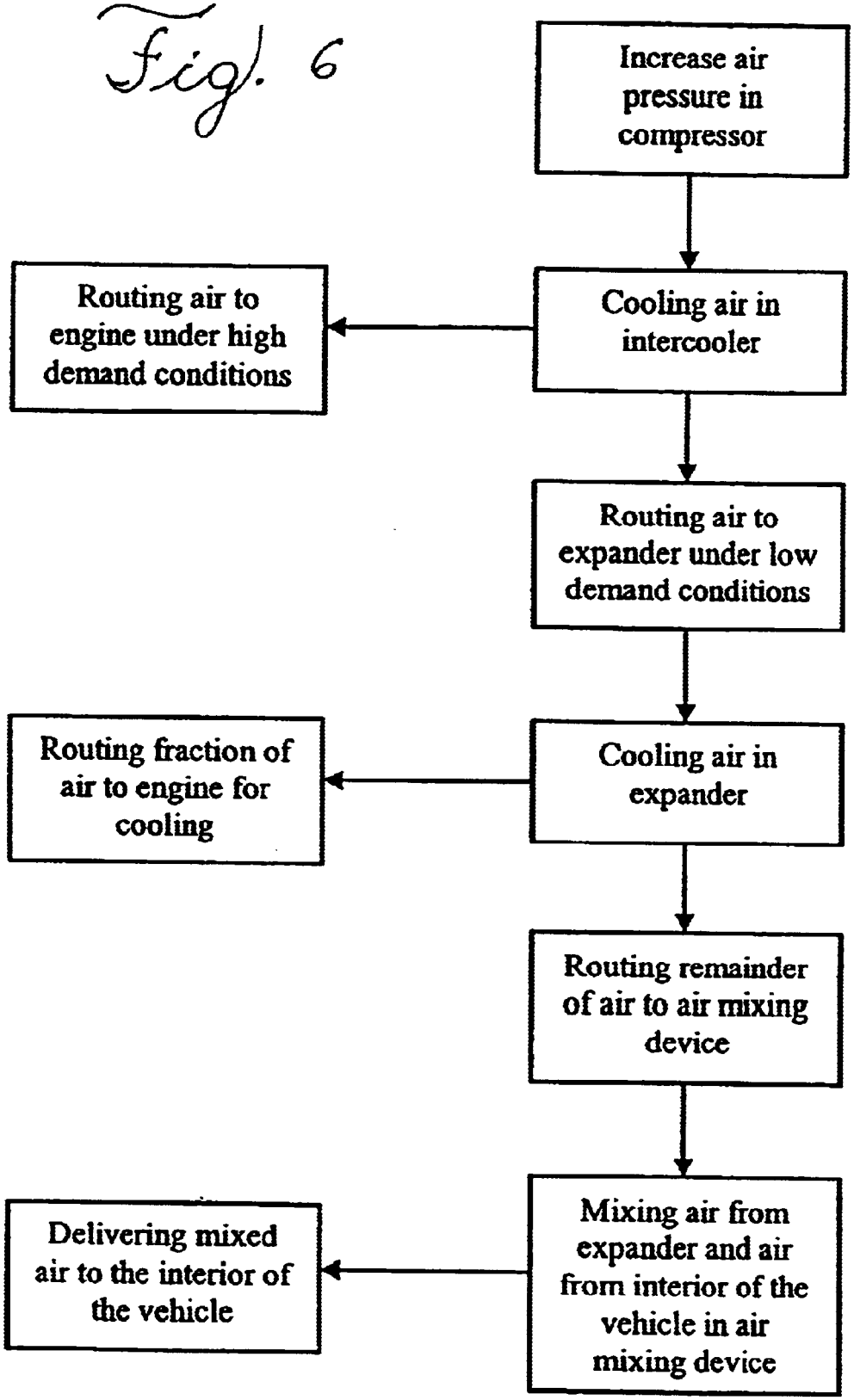
FIG. 6 is a flow chart showing the method of the present invention.

The present invention also encompasses a method for supplying conditioned air to the interior 11 of a vehicle, pressurized air to the engine 12 for aid during acceleration, and cooling air to the engine 12 to improve horsepower and fuel economy, all from the same system. Referring to FIG. 6, the method includes the steps of increasing the pressure of intake air in a compressor 10 and then cooling the air in an intercooler 14. The air from the intercooler 14 is routed to the engine during high demand conditions, such as acceleration. The air is routed to an expander 18 during low demand conditions. The air is then cooled in the expander 18, and a fraction of this cooled air is routed to the engine 12 to cool the engine 12. The remaining fraction of air exiting the expander 18 is routed to a mixer, or air handling unit 22, where it is preferably mixed with recirculated air and delivered to the interior 11 of the vehicle. The routing path and the amount of air routed to each component of the system is preferably controlled by an electronic controller. The controller preferably controls at least two bypass valves 16, 20 which change the routing path of the air. The controller also preferably controls the rotation of the valve plate 30.

In all embodiments, the present invention provides a multi-purpose air to cycle system that is capable of supercharging an engine, cooling the engine, and delivering conditioned air to the interior 11 of the vehicle. This is accomplished through the integration of multiple air systems, and results in a significant reduction in package size and weight.

It should be noted that there could be a wide range of changes made to the present invention without departing from its scope. For example, a wide range of controllers may be used to control the bypass valves 16, 20 and the air handling unit 22. These controllers can be separate or integrated into one controller. If it is necessary to further reduce the package size of the system, the compressor 10 and the expander 18 can be an integrated unit. Other bypass valves could be integrated into the system, allowing it to supply air to other vehicular components. Thus, it is intended that the foregoing detailed description be regarded as illustrative rather than limiting and that it be understood that it is the following claims, including all equivalents, which are intended to define the scope of the invention.

What is claimed is:

1. An air cycle system for use in a vehicle having an internal combustion engine, said air cycle system comprising:

a compressor having an outflow to an intercooler;

said intercooler having an outflow to a first bypass valve;

said first bypass valve having an open and a closed orientation, wherein in said open orientation, said first bypass valve directs air to said engine of said vehicle, and in said closed orientation, said first bypass valve directs air to an expander;

said expander having an outflow to a second bypass valve;

said second bypass valve being adjustable so as to direct a variable fraction of air to said engine of said vehicle and the remainder of said air to an air handling unit;

said air handling unit having at least a fan, a scroll center, a first air flow path and a second air flow path, said first air flow path having an input at said scroll center from said second bypass valve and said second air flow path having an input at said fan from the interior of said vehicle; and wherein said air handling unit mixes air from said first and said second air flow paths and directs said mixed air to said interior of said vehicle.

2. The air cycle system of claim 1, wherein said air handling unit further comprises a fan flange, a valve plate, an upstream core flange, a first and a second scroll flange, a scroll cone, a core containing triangular tubes, a downstream core flange, a condensate horn and a condensate trap.

3. The air cycle system of claim 2, wherein said air handling unit controls the temperature of the mixed air delivered to said interior of said vehicle by modulating the cold air stream from said second bypass valve and the air from said second air flow path.

4. The air cycle system of claim 3, wherein said valve plate defines openings therein and modulates said air from said second flow path.

5. The air cycle system of claim 4, wherein said air handling unit controls the humidity level of the mixed air delivered to said interior of said vehicle by trapping condensation in said condensate horn and routing said condensation to said condensate trap.

6. The air cycle system of claim 5, wherein said compressor is a high efficiency compressor with an isentropic efficiency of at least 85%.

7. The air cycle system of claim 6, wherein said compressor is a screw compressor and raises the pressure of air by a factor of 2:1.

8. The air cycle system of claim 7, wherein said compressor is driven by said engine.

9. The air cycle system of claim 8, wherein said intercooler further comprises a cycling condensate purge valve to eliminate condensation of water vapor that may collect in said intercooler.

10. The air cycle system of claim 9, wherein said first bypass valve opens during engine acceleration to supply pressurized air to said engine.

11. The air cycle system of claim 10, wherein said fraction of air supplied to said engine from said second bypass valve is utilized to improve engine horsepower and fuel economy by cooling said engine.

12. The air cycle system of claim 11, further comprising a controller utilizing an algorithm to adjust the amount of air supplied to said engine from said second bypass valve.

13. The air cycle system of claim 12, wherein said compressor and said expander are an integrated unit.

14. An air cycle system for use in a vehicle having an internal combustion engine, said air cycle system comprising:

a compressor having an output to an intercooler;

said intercooler having an output to a first bypass valve;

said first bypass valve having an open and a closed orientation, said open orientation supplying cooled and pressurized air to said engine and said closed orientation directing air to an expander;

said expander having an output to a second bypass valve;

said second bypass valve supplying a variable amount of cooled and dried air to said engine and the remaining air to an air mixing device at a first input; and said air mixing device having a second input from the interior of said vehicle and being capable of mixing air from said second bypass valve and said second input and directing said mixed air to said interior of said vehicle.

15. The air cycle system of claim 14, further comprising a controller to adjust said first and said second bypass valves.

16. The air cycle system of claim 15, wherein air exiting said expander has a lower temperature than air entering said expander and the pressure of said air exiting said expander is above atmospheric pressure.

17. The air cycle system of claim 16, wherein said intercooler is a down-flow intercooler.

18. The air cycle system of claim 16, wherein said intercooler is a cross-flow intercooler.

19. A method for supplying conditioned air to the interior of a vehicle, pressurized air to an engine for aid during acceleration, and cooling air to an engine to improve horsepower and fuel economy, said method comprising the steps of:

increasing the pressure of air in a compressor;

cooling said air in an intercooler;

routing said air from said intercooler to said engine during high demand conditions;

routing said air from said intercooler to an expander during low demand conditions;

cooling said air in said expander;

routing a variable fraction of said air from said expander to said engine to cool said engine and routing the remainder of said air to an air mixing device;

mixing said air from said expander in said air mixing device with air from the interior of said vehicle; and delivering said mixed air to said interior of said vehicle for climate control.

20. The method of claim 19, further comprising the step of adjusting the routing path and amount of air routed to each component with an electronic controller.

21. The method of claim 20, further wherein said controller controls at least two bypass valves to change the routing path of said air.

\* \* \* \* \*